United States Patent [19]

Mortenson

[11] Patent Number: 5,253,410
[45] Date of Patent: Oct. 19, 1993

[54] RETRACTABLE UNDERBODY TRUCK RAMP AND METHOD OF MAKING

[75] Inventor: Carl N. Mortenson, Midland, Mich.

[73] Assignee: Magline, Inc., Pinconning, Mich.

[21] Appl. No.: 971,519

[22] Filed: Nov. 3, 1992

Related U.S. Application Data

[62] Division of Ser. No. 681,977, Apr. 8, 1991, Pat. No. 5,199,150.

[51] Int. Cl.$^5$ .......................... B23P 11/00; E01D 1/00; B65G 11/12
[52] U.S. Cl. ....................... 29/436; 14/71.1; 414/537
[58] Field of Search ........ 29/434, 436, 525.1; 14/71.1, 71.3, 71.5; 414/537, 480, 523, 546

[56] References Cited

U.S. PATENT DOCUMENTS

| | | |
|---|---|---|
| 4,242,032 | 12/1980 | Whiteman et al. |
| 4,762,333 | 8/1988 | Mortenson . |
| 5,042,827 | 8/1991 | Mortenson . |
| 5,096,362 | 3/1992 | Best . |
| 5,097,557 | 3/1992 | Salman et al. . |

OTHER PUBLICATIONS

Magline, Inc. brochure, Form No. 211, Copyright 1990.

*Primary Examiner*—Timothy V. Eley
*Attorney, Agent, or Firm*—Learman & McCulloch

[57] ABSTRACT

A retractable ramp is telescopable to a stowed position within a rearwardly open, longitudinally extending storage chamber within a cargo vehicle frame below a cargo carrying floor therein. It can be pulled from the vehicle, tilted downwardly so that its rear end engages the ground, and then its front end can be raised and connected to the vehicle adjacent the floor of the cargo compartment to serve as an unloading or loading platform for the vehicle floor. The ramp includes carriage arms pivotally connected to the ramp assembly near its front end and extending forwardly into the storage chamber to connect to glides which are slideable along the chamber. A force asserting, weight counterbalancing mechanism is pivotally connected between the carriage arm assembly and the ramp, and positioned to exert power to assist manual movement of the front end of the ramp from an initial position in which it is pulled from the storage chamber to a raised, operatively deployed position attached adjacent the ramp floor. The ramp is so positioned in the stowing chamber as it is being stowed, and as it is being withdrawn, that it virtually floats with respect to the walls of the storage chamber and does not generate appreciable frictional forces which add to the physical exertion required to stow and remove the ramp.

17 Claims, 4 Drawing Sheets

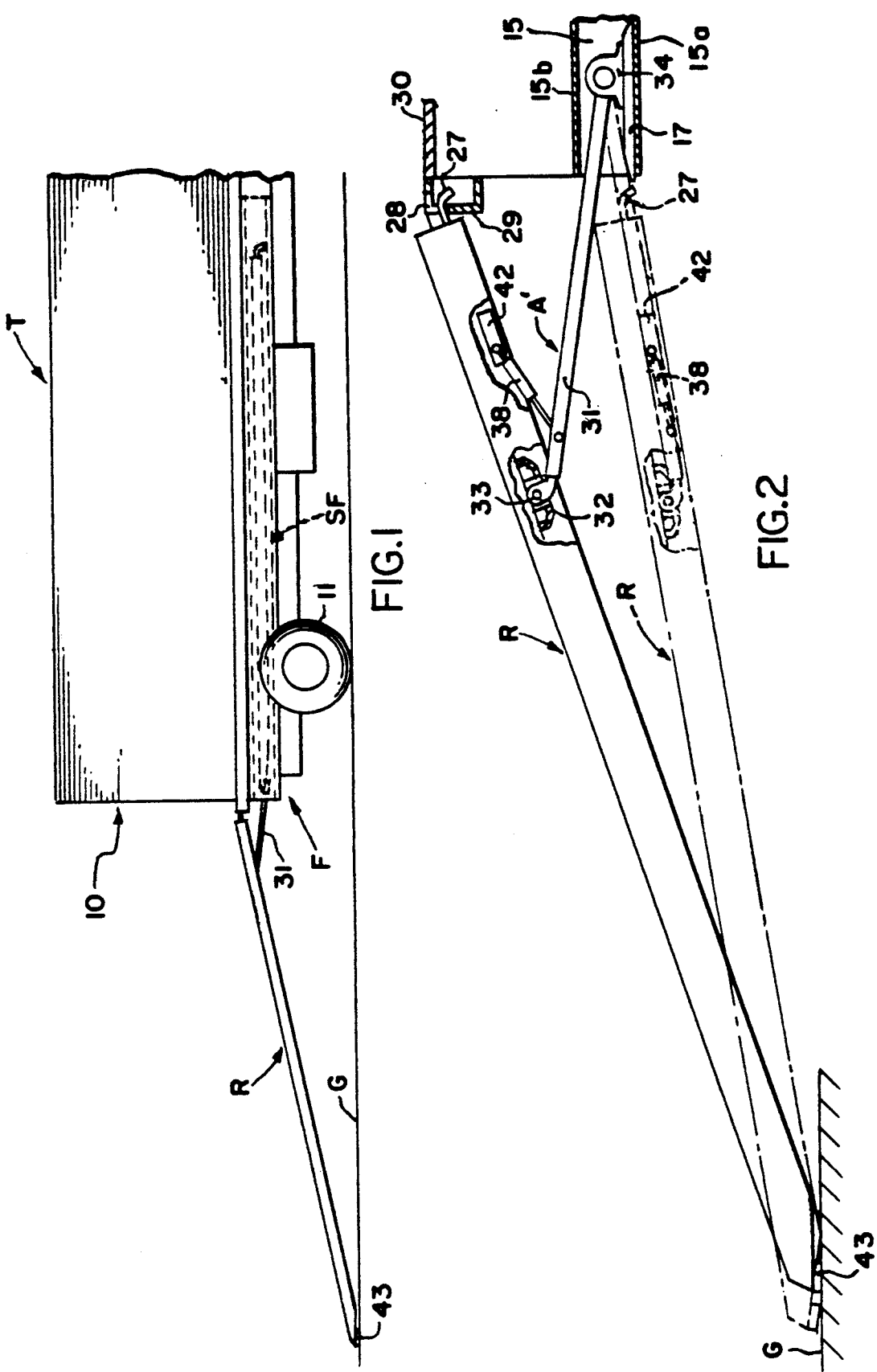

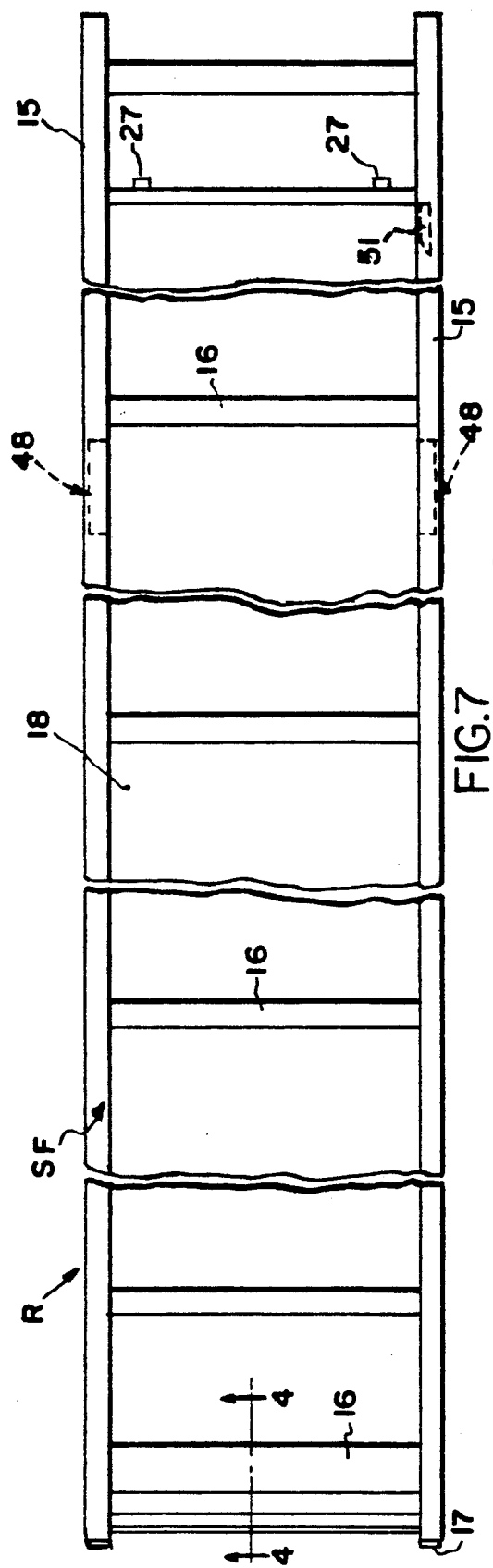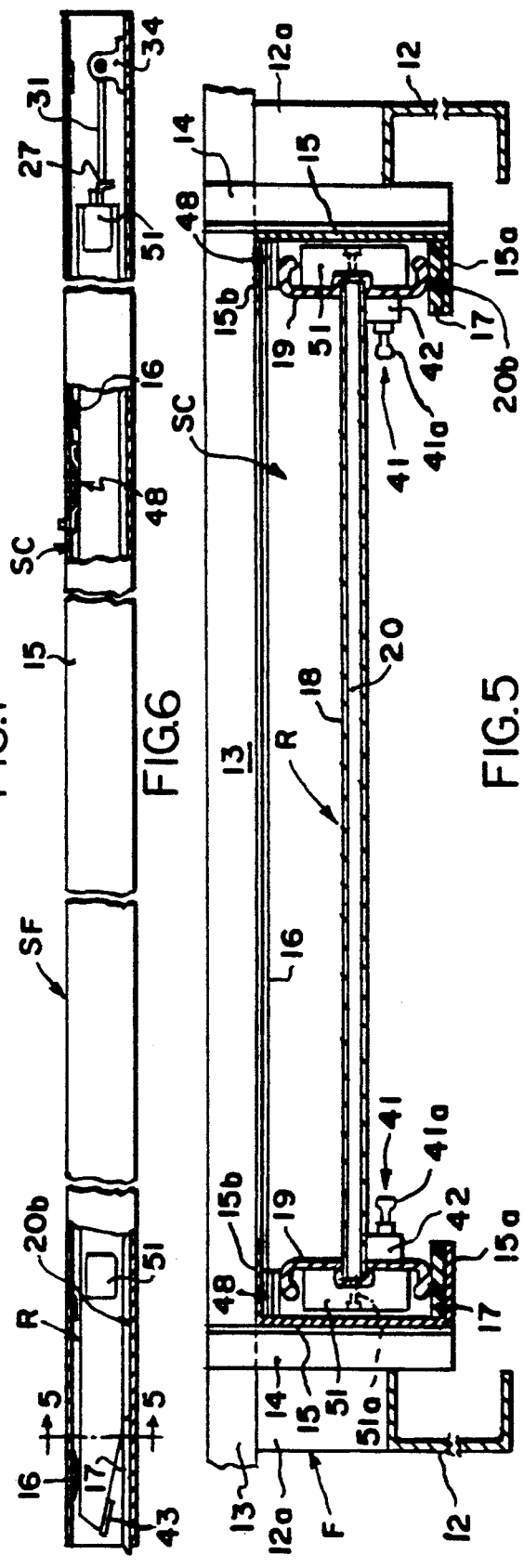

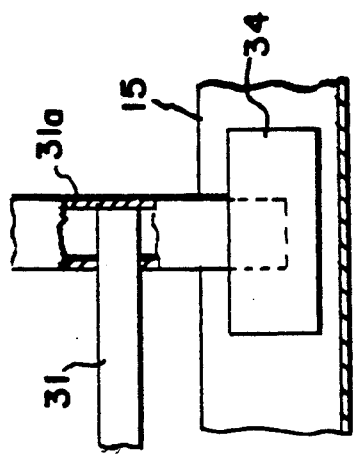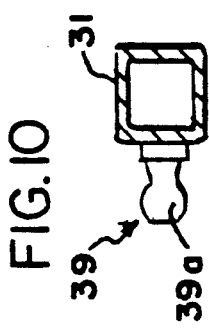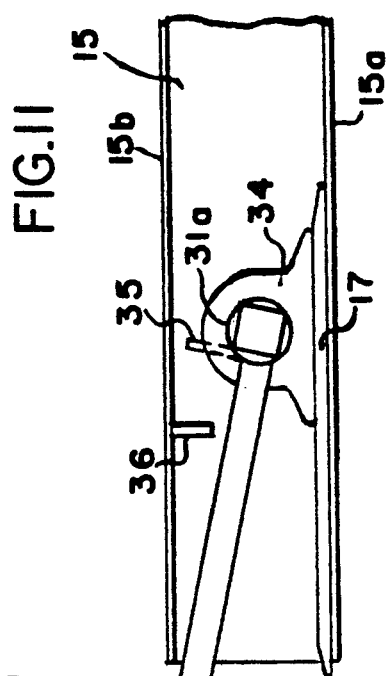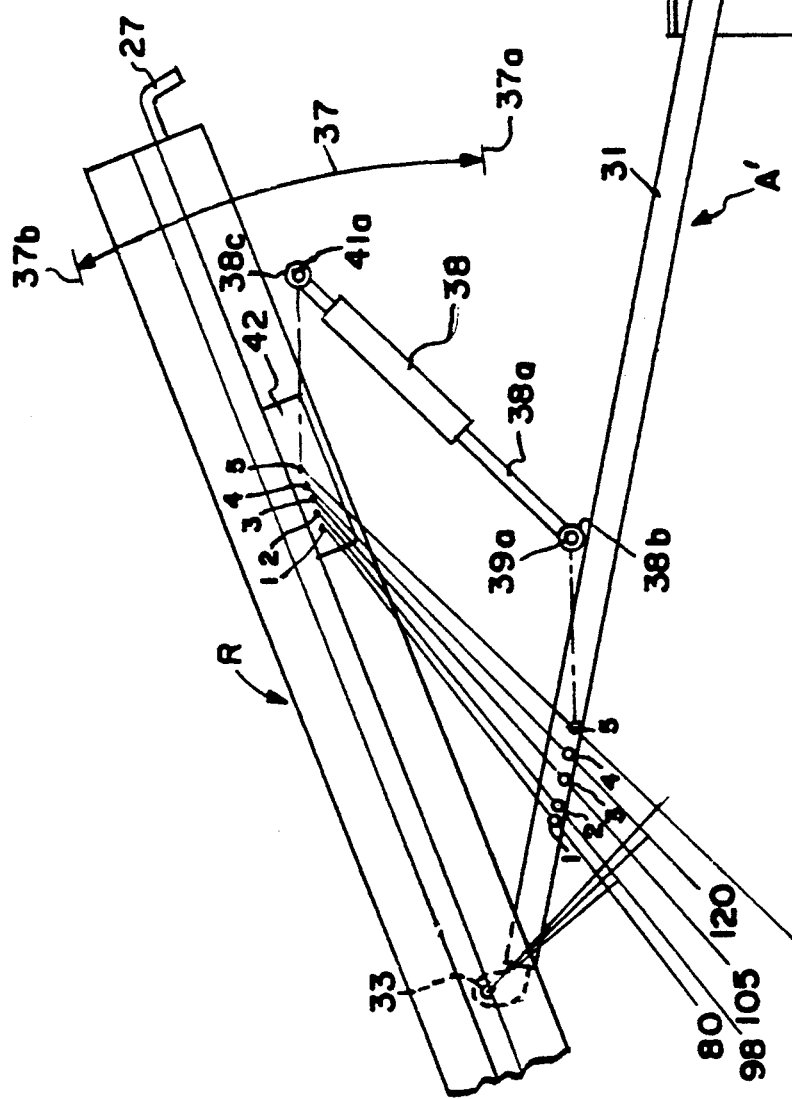

RETRACTABLE UNDERBODY TRUCK RAMP AND METHOD OF MAKING

This is a divisional of copending application(s) Ser. No. 07/681,977 filed on Apr. 8, 1991 now U.S. Pat. No. 5,199,150.

BACKGROUND OF THE INVENTION

The present invention relates particularly to truck-carried ramps which stow within the frame of the vehicle below the cargo carrying body of the motorized truck, and are adaptable to be removed rearwardly to a position in which the ramp assumes a tilted position resting on the ground and connected to the vehicle adjacent the floor of the cargo compartment so as to be useable for cargo loading and unloading purposes. Typically, support arms have been pivotally attached beneath the front ends of such ramps and and the front ends of the arms have been pivotally connected to the vehicle frame within the ramp storage chamber. These support arms have supported the front end of the ramp when it is initially extended from the vehicle until such time as the front end could be raised vertically and pulled rearwardly to hook into openings provided in the vehicle frame which retained the front end of the ramp in a raised position in which the floor of the front end of the ramp was substantially at the level of the floor of the cargo compartment of the truck. In this operatively deployed position of the ramp, hand trucks carrying considerable loads easily transfer between the ramp and the floor of the cargo container.

Applicant's assignee has marketed retractable underbody truck ramps of this type for a number of years and the present invention is directed to certain new and useful improvements which have been made in such truck-ramp structures. Applicant's assignee has manufactured a range of ramps of differing length and weight for use with cargo-carrying trucks of varying size and floor level. For example, applicant's assignee has manufactured and marketed ramps ranging from 10 to 16 feet in length, and weighing between 80 and 140 pounds, in conjunction with appropriate track assemblies forming ramp storage chambers which are adapted to be welded to the truck body frame in a position to receive both the stowed ramp floors and the front end support arms which are folded up to the ramp floors to also be received in the longitudinally extending ramp storage chambers. To provide attachment devices at a proper level to secure the front end of the ramp when it is removed from the storage chamber and raised, notches have been cut in the rear apron of the truck body at cargo floor level to receive hooks provided on the front end of the ramp. Rollers have been mounted at the front and rear ends of the ramp in a position to support the ramp above storage frame members forming tracks on which the rollers move, as the ramps and arms are pushed telescopically into the ramp stowing chamber beneath the truck body floor. Because cargo truck specifications vary with the manufacturer of the cargo truck, applicant's assignee's ramps had to be designed to accommodate to trucks having variable vertical distances between the storage chambers and beds of the truck, and to truck bodies having aprons which projected different distances.

With ramps of this prior art construction, a truck driver, typically making 10 to 12 deliveries per day, must exert considerable physical force to first remove the ramp from its storage chamber, and then raise the 60 to 80 pounds of front end dead weight of the ramp and pull it forewardly to attach it to the apron of the truck bed, each time a delivery is to be made. As a result of this, and particularly toward the end of a day when the truck operator may be tired and rushed, many drivers have simply pulled the truck ramp from the stowing chamber and sought to operate it without attaching its front end to the apron of the truck body floor. While operation in this manner avoids the physical exertion required to raise the front end of the ramp and simultaneously pull it forewardly, while its rearmost end is in engagement with, for example, a very rough concrete surface creating considerable friction, the practice is regarded as unsafe and capable of causing injury to the operator of the hand truck which is used to load and unload the vehicle, as well as to the cargo being transferred. The reason for this is that there will be a considerable drop between the floor of the cargo truck and the upper end of a ramp which has not been raised to the level of the truck bed and attached thereto. When cargo is being unloaded from such a truck bed by hand truck and the wheels of the hand truck fall from the bed to the upper end of the ramp, injuries to the back of the hand truck operator who normally is the driver of the truck, can occur and, of course, cargo being carried on the hand truck may fall off the hand truck and drop a considerable distance to the ground. The practice is also very hard on hand trucks, and can materially shorten their useful lives.

SUMMARY OF THE INVENTION

The improvements which will be first generally, and then particularly, discussed herein seek to significantly ease the physical exertion required to move the ramp from a stowed position to an operative attached position, and to unhook it and restow it. Raise-assisting, weight counterbalancing mechanisms have been incorporated in an improved ramp structure to considerably decrease the lifting force which must be exerted by the operator to raise the front end of the ramp structure to a position in which no vertical lifting force is required to maintain the vertical position of the ramp, and attachment to the apron of the truck bed is greatly facilitated. In addition, members have been incorporated with the ramp assembly at both ends of the ramp for assisting it to slide both on the ground and freely within the storage chamber, and members have been incorporated for preventing the metal ramp assembly from engaging the metal storage chamber.

One of the prime objects of the present invention is to provide a ramp assembly of the character described which is far easier to deploy and stow than known existing ramp structures of a similar nature, and so encourages the operator to correctly deploy the ramp during the many times each day he is required to unload cargo at many different and often widely spaced locations.

Still another object of the invention is to provide a ramp structure in which the same interchangeable parts can be used to support and deploy ramps of differing length and weight, with the parts providing a vertical zone in which the upper ends of the ramps are counterbalanced for attachment, even though the weights of the ramps may differ, and the heights to which the front ends of the ramps must be raised to reach attaching position also differ.

Another object of the invention is to provide improved ramp structures of the character described which are rugged and will withstand continual and rough usage, and which require considerable less maintenance and replacement than formerly.

Still another object of the invention is to provide a versatile ramp structure of highly reliable character which is economical to manufacture and can be marketed at prices which are well within the means of truck operators.

Finally, still another object of the invention is to provide a greatly improved, stowable, ramp structure which promotes both personal safety and the safer transport of valuable cargo to and from the truck.

Other objects and advantages of the invention will be pointed out specifically or will become apparent from the following description when it is considered in conjunction with the appended claims and the accompanying drawings.

DESCRIPTION OF THE DRAWINGS

In the drawings, FIG. 1 is a schematic side elevational view showing a ramp in operatively deployed position, attached to the rear end of the truck vehicle, the broken lines indicating a ramp storage chamber and a stowed position of the ramp;

FIG. 2 is a similar, side elevational view on an enlarged scale, taken partly in section, and with broken lines illustrating the position of the ramp when it is initially pulled from the storage chamber, before its front end is attached in operatively deployed position;

FIG. 5 is a considerably enlarged transverse sectional view, taken on the line 5—5 of FIG. 6, which more particularly illustrates the stowed position of the parts, the gas cylinders being omitted to more particularly illustrate the attachment fittings which mount the cylinders in selected position;

FIG. 6 is a side elevational view of the storage chamber frame, with parts being broken away to show portions of the stowed ramp assembly therein;

FIG. 7 is a top plan view of the storing chamber frame with portions being broken away to show the ramp stored therein;

FIG. 9 is an enlarged, schematic, side elevational view, similar to FIG. 3, which illustrates the static balance positioning provided by the counterbalancing gas cylinders;

FIG. 10 is an enlarged, fragmentary, top plan view illustrating the connection of the ramp arm assembly to the slide blocks; and FIG. 11 is an enlarged, transverse sectional view of one of the members which connect the gas cylinders to the ramp arm assembly.

Figure 4:
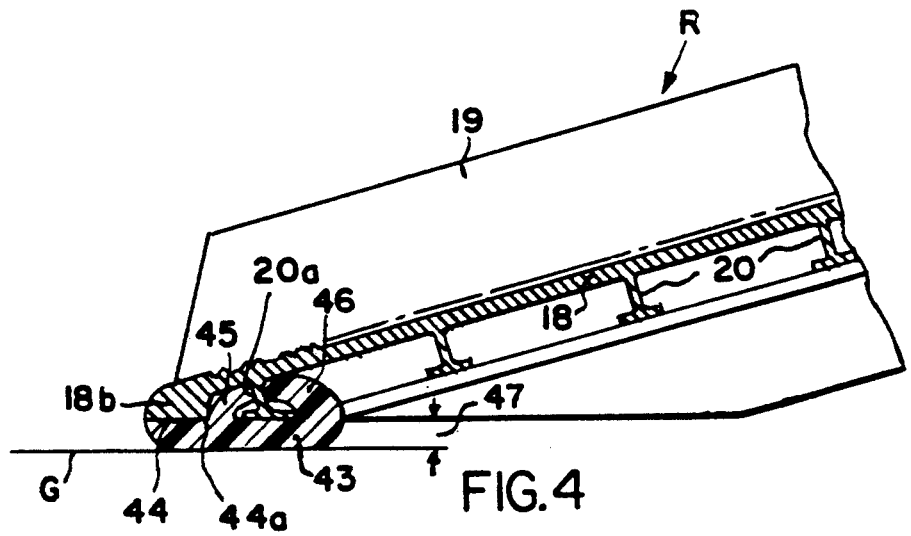
FIG. 4 is an enlarged, fragmentary, sectional, side elevational view of the rear end of the ramp only taken on the line 4—4 of FIG. 7 to illustrate the manner in which an anti-friction foot pad is provided on the rear end of the ramp.

Referring now more particularly to the accompanying drawings, and in the first instance particularly to FIG. 1, a typical four-wheeled cargo-carrying truck, generally designated T, is disclosed as having a cargo container or compartment 10 supported on wheels 11 for movement along a highway or road system to a loading or unloading location. The motorized truck T in the usual manner includes an operator's driving cab and engine (neither of which are shown) connected to the truck body. The truck body frame F typically includes transversely spaced longitudinally extending chassis rails 12 beneath the compartment 10, on which body long sills 12a are fixed. The ramp storage chamber frame SF may be supported between these members on truck body frame cross members 13 by welding hanger angles 14 to the body frame cross members 13, as FIG. 5 particularly indicates. The storage channel frame SF typically includes transversely spaced, oppositely disposed, steel side channels 15 which may be connected at their upper ends by bridging cross members 16. The lower flanges 15a of channels 15 comprise a storage channel floor or track, and the upper flanges 15b form the top of the storage chamber which is generally designated SC. The channel members 15 are also formed of steel, so as to be weldable to the frame members 13 and 14, and provided at the rear ends of channel rails 15, in a fixed position on the flanges 15a, are rugged synthetic plastic spacer plates 17 which are formed of a low friction, ultra high molecular weight plastic material, such as polyethylene. The material has a molecular weight in the neighborhood of 3.1 million.

As FIGS. 5 and 6 both indicate, a ramp assembly or ramp, generally designated R, is slideable into the open rear end of the storage chamber SC to move to a completely stowed position within storage chamber SC. The ramp assembly R, which is preferably formed from a lightweight material such as aluminum, includes a floor 18 spanning side rails 19, and having traction projections 18a at longitudinal intervals integrally formed in its upper surface. Inversely T-shaped, downwardly projecting, integral ribs 20 span the floor 18. At its rear end, the floor plate 18 has a dependent stepped portion 18b (FIG. 4) which spans the side rails 19 and slots (not shown) may be provided in the floor plate 18 to provide hand grips. Alternatively, handles may be provided on the ends of the side rails 19 which can, of course, also be easily grasped by the operator. At the front end of the ramp R, see FIG. 2, transversely spaced downwardly dependent hooks 27 provided on the floor 18 are adapted to hook into the usual openings 28 provided in the rear apron 29 of the truck body floor plate or bed 30.

Provided to connect the ramp R to the storage chamber SC, is a carriage arm frame generally designated A comprising a pair of arms 31 which each pivotally connect at their rear ends to the ramp R. Transversely spaced fittings 32 (FIG. 3), welded to the floor 18 of the ramp R and its dependent rib members 20, support pivot pins 33 on which the rear ends of arms 31 are pivotally received. At their front ends, arms 31 connect to a spanning rail 31a which has bearing block, anti-friction slide guides 34 pivotally received thereon. As FIG. 9 indicates, stops 35 affixed to the rail 31a engage stops 36 which depend from the channel flanges 15b to prevent the carriage arm assemblies A from being drawn completely out of the storage chamber SC. In this sense, they couple the carriage arm assemblies A to the storage chamber frame members 15. The guides 34, which ride along the spacers 17 at the front end of the stowing chamber SC, and then along the flanges 15a of the channel rails 15, remain in position on these surfaces due to the weight of the ramp, and it is the arms 31 which pivot with respect to the blocks 34, which may be molded of the same ultra high molecular weight polyethylene material. Carriage arm assemblies A have been previously used with stowable ramps, but have not in any way relieved the operator of the necessity of physically raising the upper end of the ramp R from the position shown in phantom lines in FIG. 2 to the raised attached position.

Provided to counterbalance the weight of the front end of the ramp R and retain it in a statically balanced position anywhere within the range of positions indicated by arc 37 (FIG. 9) are a pair of gas cylinders 38 which connect in predesignated positions to the arms 31 and to the ramp R. It is to be understood that gaseous pressure within each of the cylinders 38 exerts a constant pressure on their pistons and yieldably resists any compression of the piston rods 38a into the cylinder casings. Within the arc 37, the weight of the front end of the ramp R is so counterbalanced by the pair of gas cylinders 38 that it remains in a condition of static balance, due to the static friction at all three sets of pivot points A, B and C. Pivot points A may be considered to be the two pins 33, pivot points B may be considered to be the connections of the cylinders 38 to ball fittings 41 received in one of the sets of openings 1-5 provided in the blocks 42 affixed to ramp R (FIGS. 3 and 5), and pivot points C may be considered to be the connections of the cylinder rods 38a to the ball fittings 39 received in the matching threaded openings 1-5 provided in each of the arms 31. Each of the fittings 41 and 39 have threaded ends which are removably, selectively received in the threaded openings 1-5 provided in blocks 42 and arms 31 respectively.

As FIG. 9 indicates, for ramps having overall weights of 80, 98, 105, 120 and 140 pounds, a pair of gas cylinders 38, which each exert a constant pressure of 225 pounds, provide the so-called "dead band" arc 37. As the front end of the ramp R is raised by the operator manually, the moment arm from pivots A to the selected openings in the set of openings 1-5 in the arms 31 increases. When the front end of the ramp reaches the lower end 37a of the arc 37, the front end of the ramp R will remain in position, if the operator releases it. With the counterbalancing forces exerted by gas cylinders 38, the front end of the ramp R may be moved to any position in the arc 37 which is opposite truck floor with virtually no exertion of pressure by the operator.

In the first removed position, illustrated in broken lines in FIG. 2, the piston rods 38a within the gas cylinders 38 are in a fully retracted, fully operatively compressed position, whereas, when the ramp is in the deployed position, the piston rods 38a are in an expanded position. In the counterbalanced zone arc 37, the hooks 27 remain in the openings 28. At its lower end, each gas cylinder 38 has a socket fitting 38b permitting it to pivotally receive the ball end 39a of the pivot fitting 39. At its upper end, each of the gas cylinders 38 has a socket fitting 38c permitting it to be attached via the ball end 41a of fitting 41 to a like set of openings in the openings 1-5 provided in the blocks 42 which are welded to the lower ends of ramp crossbars 20.

Figure 3:
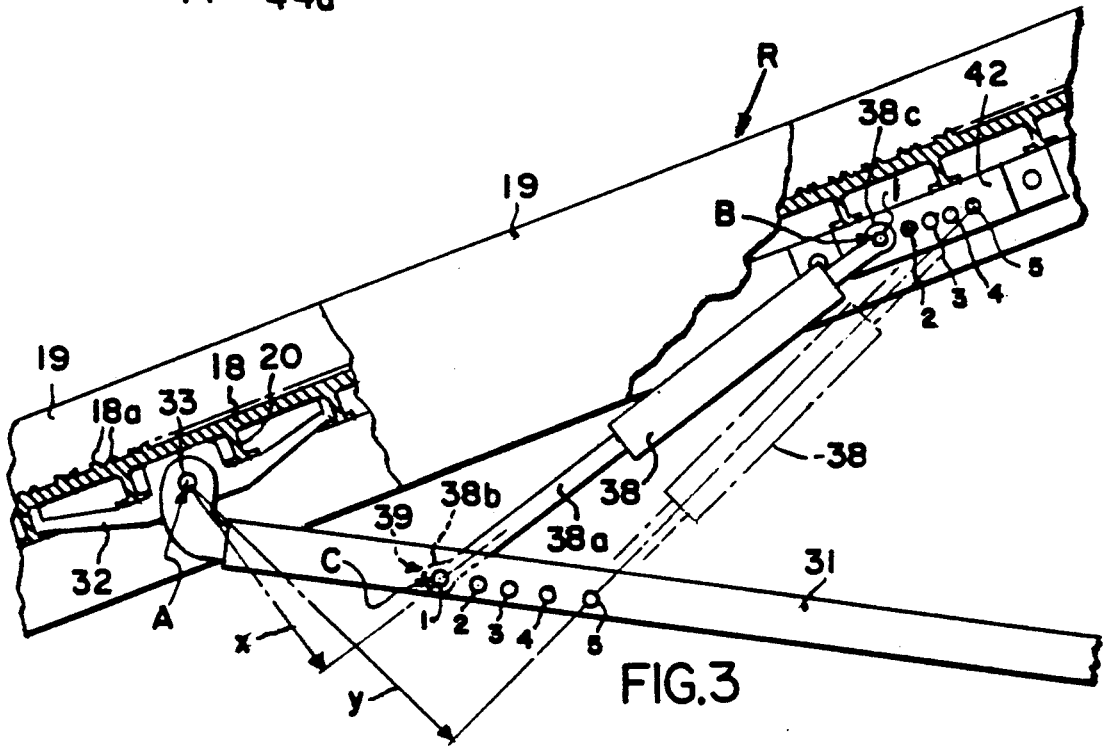
FIG. 3 is a still further enlarged, fragmentary side elevational view, taken partly in section, particularly showing the various positions in which the weight counterbalancing mechanism may be connected, dependent on the weight of the ramp in use.

In FIG. 3, gas cylinders 38 are attached in the number 1 position and exert their pressure counterbalancing through a moment arm x. Had the cylinders 38 been attached in the number 5 position, as indicated by the broken lines in FIG. 3, the force exerted would have been exerted through a greater moment arm y. The same gas cylinders 38 are, for this reason, capable of counterbalancing ramps of the range of weights indicated in FIG. 9 in the dead band 37 position. Not only do the counterbalancing cylinders 38 provide the static balancing indicated by arc 37, they also considerably lessen the force required to initially lift them to the dead band 37 a position from the initial position of deployment shown in broken lines in FIG. 2. For example, with a ramp weighing 140 pounds and cylinders 38 attached in the number 5 positions on arms 31 and blocks 42, only a force of 42 pounds is initially required. In this attached position of the cylinders 38, a dead band arc of 13½ inches is provided. With a ramp weighing 105 pounds and the cylinders 38 attached in the number 3 positions provided by the threaded openings in arms 31 and blocks 42, initial lifting force through the moment arm need be only 34 pounds and a dead band arc which extends 14 inches is provided. As the weight of the ramp decreases, the initial lifting force required decreases, and the dead band length tends to increase. Thus, it will be seen that, even though the moment arm through which the force is exerted in the first position of deployment shown in broken lines in FIG. 2 is relatively small, still gas cylinders 38 provide a lift assist function of importance to keep the initial lifting force which must be exerted by the operator within low limits. Push-down forces to compress the cylinders 38 below dead band 37 are similarly, of course, maintained within low limits.

To assist the operator in moving the ramp R rearwardly to attach the hooks 27 to the apron 29, an ultra high molecular weight polyethylene foot 43 of the same material is provided with a recessed shelf 44 which receives the dependent protrusion 18b on the lower end of the ramp. The members 43 include resilient curvilinear arms 45 and 46 which are deformable to a spread position such that they will pass the bar 20a provided on the lower end of the lowermost bar 20 and then resiliently snap into a position in which the arms 45 and 46 abut the web 20a of the rib member 20, while engaging the lower surface of the ramp floor 18. At its upper end, the shoulder 44a of the shelf 44 will bear on the foot part 18b in this position, when the flange 20a is in engagement with the body of the member 43. The foot 43 depends, to support the ramp side walls 20 at a predetermined distance 47 above the cement floor or the like on which the very low friction foot 43 supports the ramp at ground level G.

When the ramp is to be stowed in the storage position illustrated in FIG. 6, the lower edges 20a of side walls 20 are supported at a predetermined distance above the metal floor formed by channel webs 15 by the very low friction rear end spacers 17. At its front end, the ramp structure is supported by the slide blocks 34 to hold the entire ramp structure away from the lower flanges 15a of the storage chamber. In this position of the parts, the carriage arms 31 are folded to abutting engagement with the ramp floor 18 and are positioned above the lower flanges 15a of channels 15.

Figure 8:
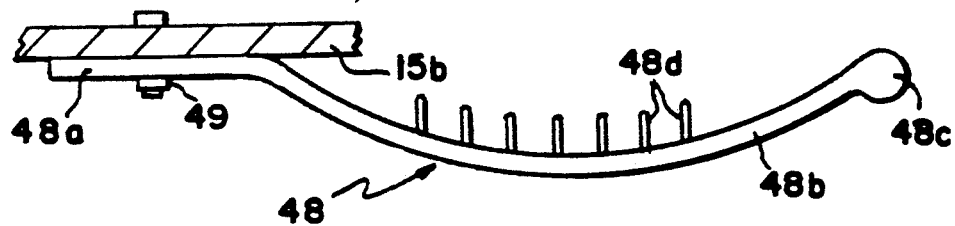
FIG. 8 is an enlarged, side elevational view illustrating the resilient plastic apring members mounted within the storage chamber near the front end thereof.

As shown in FIG. 8 particularly, ultra high molecular weight springs of the same polyethylene material, generally designated 48, are provided in the position shown in FIG. 6 on the upper flanges 15b of the channels 15. Each spring includes a portion 48a which attaches to a flange 15b by bolts 49, and has a downwardly dependent curvilinear section 48b, with a bead type free bearing end 48c. Provided on the upper surface of the portions 48b are a series of collapsible resilient columns or pins 48d which can flatten out, when the ramp structure R deforms the springs upwardly and brings the pins 48d into engagement with the upper webs 15b. When this occurs, the pins 48d are collapsed and the whole structure of the springs 48 will cushion the ramp in the stowed position and prevent its contact with flanges 15b. While curvilinear springs of steel have previously been provided, the low friction springs 48, with the collapsible pins 48d, accomplish a greater cushioning while providing far less resistance to sliding of the ramp structure into the stowed position.

Provided in the present structure to prevent contact of the ramp structure with the web side walls of channels 15 are longitudinally spaced guide blocks 51 which are bolted as at 51a to the sides 19 of the ramp. These blocks 51 protrude a distance laterally beyond the sides 19, as shown in FIG. 5, but not far enough to engage the web walls of channels 15. They are provided at longitudinally spaced intervals along the ramp structure and function to prevent the metal channel walls 20 from laterally contacting the channels 15. They are constructed also of the same ultra high molecular weight polyethylene and have very low frictional resistance.

THE OPERATION

When the particular ramp structure is being mounted to the ramp body, the stowing chamber SC is first securely welded in position in a manner previously described. The ramp structure R will use the same carriage arm structure A and slide glides 34. If the ramp R is, however, to have a certain predetermined length, and consequently a certain predetermined weight, gas cylinders 38, which will be used for all weights to exert the same constant pressure, will be mounted by one of the matched sets of openings 1, 2, 3, 4, or 5, in arms 31 and blocks 42, dependent on the weight of the ramp and the dead band arc 37 which is to be achieved. The dead band arc 37 must extend sufficiently so that no substantial lifting force need be applied to raise the front end of the ramp 20 at a time when the ramp R is being pulled rearwardly to attach its hooks 27 in the truck apron openings 28. The set of openings 1–5 which is chosen predetermines the moment arm about pivots 33 through which the gas cylinders 38 operate in raising the front end of the ramp. Because of the placement of the pins 33 near the front end of the ramp, the center of gravity of the ramp structure is rearwardly of the pins 33. Once the angle of repose between the rods 38a and the arms 31 in the initial position of deployment is broken by the operator physically raising the front end of the ramp, the moment arm through which the cylinders 38 operate increases as the front end of the ramp raises until a full counterbalancing of the front end of the ramp occurs in the band 37. Once the front end of the ramp reaches the so-called dead band arc 37 in which it is virtually weightless, it is far easier for the driver-operator to pull the ramp structure R rearwardly and deploy the hooks 27 in attached position.

When the truck bed 30 has been loaded or unloaded the release of the hooks 27 is further easily accomplished and, once this has occurred, the front end of the ramp R can be pushed from the position shown in solid lines to the position shown in broken lines. In this position of the parts, the moment arm has been reduced to a negligible 1½ inches and the carriage arm assembly A remains in the collapsed position in which it is shown, because the force exerted by the gas cylinders is not sufficient to in any way change the relationship.

The operator need merely then proceed to the rear of the ramp structure to grasp the hand holds and raise the ramp to a position in which it can enter the storage chamber SC. The glide blocks 34, which are at this time resting on spacer plates 17, slide forwardly along the plate 17 and then proceed to and along the lower webs 15a to front end of the storage chamber SC and the stowed position of the ramp illustrated in FIG. 6. At this time, the metal ramp structure is prevented by polyethylene parts 17, 34, 48 and 51 from contacting the metal walls of the storage chamber. The shock absorbing springs 48 are deformed upwardly and pins 48d, which essentially are miniature compression columns, collapse to frictionally and resiliently resist upward movement and vibration of the stowed ramp structure.

Although preferred embodiments of the invention have been illustrated in the accompanying drawings and described in the foregoing detailed description, it will be understood that the invention is not limited to the embodiments disclosed, but is capable of numerous rearrangements, modifications and substitutions of parts and elements without departing from the spirit of the invention which is defined in the following claims.

What is claimed is:

1. The method of assembling a retractable ramp of the type which is stowed within a rearwardly open storage chamber within a vehicle frame below a vehicle floor provided in a vehicle for carrying cargo, and which in an operative deployed position is extended from the vehicle frame, tilted downwardly, and selectively connected to the vehicle frame to serve as a loading or unloading platform for the vehicle frame, the ramp being one of a series of ramps of differing length having a range of weights, each of the ramps having a rear end adapted to engage the ground surface on which the vehicle is deployed and a front end adapted to be releasably connected to the vehicle adjacent the rear end of the vehicle floor, the retractable ramp including an arm means pivotally connected to the ramp floor assembly near the front end thereof and extending forwardly into the storage chamber to couple thereto, each of the ramps and the arm means having a plurality of attachment positions provided thereon, the steps of:

a. selecting one of said series of ramps;

b. pivotally connecting, between the ramp and arm means, force exerting means to one of said attachment positions such that it will exert a force, through a moment arm of increasing length as the front end of the ramp is manually raised about the pivotal connection of the arm means to the ramp as a fulcrum, which maintains the front end of the ramp in a position substantially opposite the vehicle floor without the required imposition of upward or downward manual force; and c. removing the upward pressure exerted manually on the front end of the ramp floor assembly, pulling it manually forewardly to a location of attachment to the rear end of the vehicle adjacent the vehicle floor, and attaching it to the rear end of the vehicle adjacent the vehicle floor.

2. A method of operating a retractable ramp of the type which, in inoperative position, is telescoped within a rearwardly open longitudinally extending storage chamber within a cargo carrying vehicle frame below a vehicle floor provided therein, and in operative deployed position is extended from the vehicle frame, tilted downwardly, and releasably connected to serve as an unloading or loading platform for said vehicle floor, the ramp having: an elongate ramp floor assembly having a rear end adapted to engage the ground surface on which the vehicle is deployed and a front end adapted to be releasably connected to the vehicle adjacent the rear end of the vehicle floor, an arm means pivotally connected to the ramp floor assembly near the front end thereof and extending forwardly therefrom into the storage chamber to support the front end of the ramp floor assembly when the latter is initially withdrawn from the chamber, force asserting, weight counterbalancing means pivotally connected between the arm means and ramp floor assembly and positioned to exert power to assist manual movement of the ramp floor assembly from an initial position of extended inoperative deployment when the force asserting means is more nearly coextensive with the ramp floor assembly to an operative second position of tilted deployment in which the front end of the ramp floor assembly is raised relative to the arm means and can be connected to the rear end of the vehicle to serve as a platform leading to and from the vehicle floor, the force asserting means being positioned so as to exert a force through a moment arm of increasing length as the front end of the ramp floor assembly is manually raised about the pivotal connection of the arm means to the ramp floor assembly as a fulcrum such that, near the upper end of the raising movement, substantially no vertical manual force is required to be exerted to maintain the front end of the ramp floor assembly in the vertical position in which it is deployed, to facilitate the ready connection of the front end of the ramp floor assembly to the said vehicle adjacent to said vehicle floor, the steps of:

a. exerting upward pressure to raise said front end to a position in which the tilted ramp remains in raised position, b. removing the upward pressure exerted manually on the front end of the ramp floor assembly and pulling it manually forewardly to a location of attachment to the rear end of the vehicle adjacent the vehicle floor.

3. The method of claim 2 wherein said force asserting means comprise a pair of laterally spaced constant pressure exerting cylinder and piston assemblies in which, acting through a predetermined moment arm, they together balance the weight of the front end of the ramp floor assembly to retain it in position at substantially the level of the vehicle floor without the imposition of manual upward or downward force.

4. In a retractable ramp of the type which in an inoperative position is telescoped within a rearwardly open, longitudinally extending storage chamber within a vehicle frame below a vehicle cargo supporting floor provided therein, and in operative position is extended from the vehicle frame, tilted downwardly, and releasably connected to serve as an unloading or loading platform for said vehicle floor, the combination of:

a. an elongate ramp floor assembly having a rear end adapted to engage the ground surface on which the vehicle is deployed and a front end adapted to be releasably connected to the vehicle adjacent the rear end of the vehicle floor;

b. a floor defining said storage chamber;

c. an arm means pivotally connected to said ramp floor assembly near the front end thereof and extending forwardly therefrom into the said storage chamber;

d. a transport device provided on the front end of said arm means to support the front end of said ramp floor assembly when the latter is withdrawn from said chamber, movable along said chamber when the ramp floor assembly and arm means are to be stored in said chamber, said transport device comprising a pair of laterally spaced, low friction, synthetic plastic slide blocks to which said arm means pivotally connect, mounting for sliding movement along said storage chamber;

e. a pair of fixed synthetic plastic slide plates at the rear end of the chamber; and f. said slide blocks supporting the ramp floor assembly and arm means above the floor of the storage chamber at the front end of the chamber when the ramp floor assembly and arm means are moving forwardly to stowed position, while the fixed slide plates support the rear end of the ramp floor assembly in raised position above the floor of the storage chamber as the ramp floor assembly and arm means move to stowed position.

5. The invention of claim 4 in which said storage chamber has side walls and low friction, synthetic plastic plates protrude from said ramp floor assembly at longitudinally spaced intervals to prevent contact of said ramp floor assembly and storage chamber side walls.

6. In a retractable ramp of the type which in inoperative position is telescoped within a rearwardly open, longitudinally extending storage chamber within a vehicle frame below a vehicle cargo supporting floor provided therein, and in operative position is extended from the vehicle frame, tilted downwardly, and releasably connected to serve as an unloading or loading platform for said vehicle floor; the combination with a vehicle having said vehicle frame of:

a. an elongate ramp floor assembly having a rear end adapted to engage the ground surface on which the vehicle is deployed and a front end adapted to be releasably connected to said vehicle adjacent the rear end of said floor;

b. an arm means pivotally connected to said ramp floor assembly near the front end thereof and extending forwardly therefrom into the said storage chamber;

c. a transport device provided on the front end of said arm means to support the front end of said ramp floor assembly when the latter is withdrawn from said chamber, and movable along said chamber when the ramp floor assembly and arm means are to be stored in said chamber;

d. force asserting, weight-counter balancing means pivotally connected between said arm means and ramp floor assembly and positioned to exert power to assist manual upward movement of the front end of the ramp floor assembly from an initial position of extended inoperative deployment, in which the front end of the ramp floor assembly is removed from the storage chamber and the transport device remains in the storage chamber to support the ramp floor assembly in a position in which the arm means and force asserting means are more nearly coextensive with said ramp floor assembly to an operative second position of tilted deployment in which the front end of said ramp floor assembly is raised relative to said arm means and can be connected to the rear end of said vehicle to serve as a platform leading to and from said vehicle floor;

e. said force asserting means being positioned so as to exert a counterbalancing force through a moment arm of increasing length about the pivotal connection of the arm means to the ramp floor assembly as a fulcrum as the front end of the ramp floor assembly is manually raised such that, near the upper end of the raising movement, substantially no vertical manual force is required to be exerted to maintain the ramp floor assembly in the vertical position in which it is deployed and ready horizontal connection of the front end of said ramp floor assembly to said vehicle is facilitated., 7. The ramp of claim 6 wherein said force asserting means is a pair of laterally spaced gas-filled cylinder and piston assemblies with the gas therein maintained under a predetermined constant pressure.

8. The ramp of claim 6 wherein a low friction, synthetic plastic, slide block is incorporated with the rear end of said ramp floor to depend therefrom and support the rear end of the ramp floor.

9. The ramp of claim 8 wherein said ramp floor assembly incorporates a cross bar of inverse T-shape at its rear end, and said synthetic plastic block has a shelf portion at its rear end for receiving the rear end of said ramp floor and resilient arms forward of said shelf portion grasping said cross bar from opposite sides thereof.

10. The ramp of claim 6 wherein said ramp floor assembly has a group of longitudinally spaced apart attachments near its front end for selective attachment thereto of one end of said force asserting means, and a series of spaced apart attachments are provided for said arm means for selective attachment of the opposite end of said force asserting means, dependent on the weight of the end of the ramp floor assembly to be manually raised.

11. The ramp of claim 10 wherein, with each pair of attachments in said series and group respectively, to which the ends of said force asserting means may be connected, the increasing moment arm, as the front end of the ramp floor assembly is lifted, is such that the ramp floor assembly will remain in the position in which it is deployed as the said front end approaches a level opposite the said floor of the vehicle.

12. The ramp of claim 6 wherein said vehicle frame has openings provided therein adjacent floor level, and the front end of said ramp floor assembly has inverted hooks which are received therein.

13. The ramp of claim 6 wherein said vehicle frame, near the front end of said storage chamber, has a synthetic plastic plate with a convex portion depending into said storage chamber in the path of said ramp floor assembly to be compressed thereby, said storage chamber having a roof part to which said plate is attached and said convex portion of the plastic plate having a series of upstanding, collapsible columns thereon.

14. The ramp of claim 6 wherein the front end of said arm means has a pair of laterally spaced, low friction, synthetic plastic slide blocks comprising said transport device, to which said arm means pivotally connects such that said arm means does not contact the storage chamber, mounted for sliding movement in said storage chamber.

15. The ramp of claim 14 in which the rear end of said storage chamber has a pair of fixed synthetic plastic slide plates on which said slide blocks travel at the rear end of the storage chamber.

16. The ramp of claim 6 wherein said storage chamber has side walls and said ramp floor assembly has side rails, and exterior synthetic plastic blocks are attached to the exterior side surfaces of said side rails to project laterally from the side rails at longitudinally spaced positions, said blocks being slidably received in said storage chamber between the side walls thereof and preventing contact of the respective said side walls and side rails of the ramp floor assembly and storage chamber.

17. The ramp of claim 6 wherein said storage chamber has a floor and the rear end of the storage chamber has a synthetic plastic floor plate upstanding from the floor of the storage chamber, and said slide device has synthetic plastic block portions positioned with respect to said arm means and ramp floor assembly such that said ramp floor assembly and arm means in stowed position do not contact the floor of said storage chamber.

* * * * *